No. 636,971. Patented Nov. 14, 1899.
J. J. FORCIER.
SHUT-OFF FOR HOSE.
(Application filed Nov. 9, 1898.)
(No Model.)
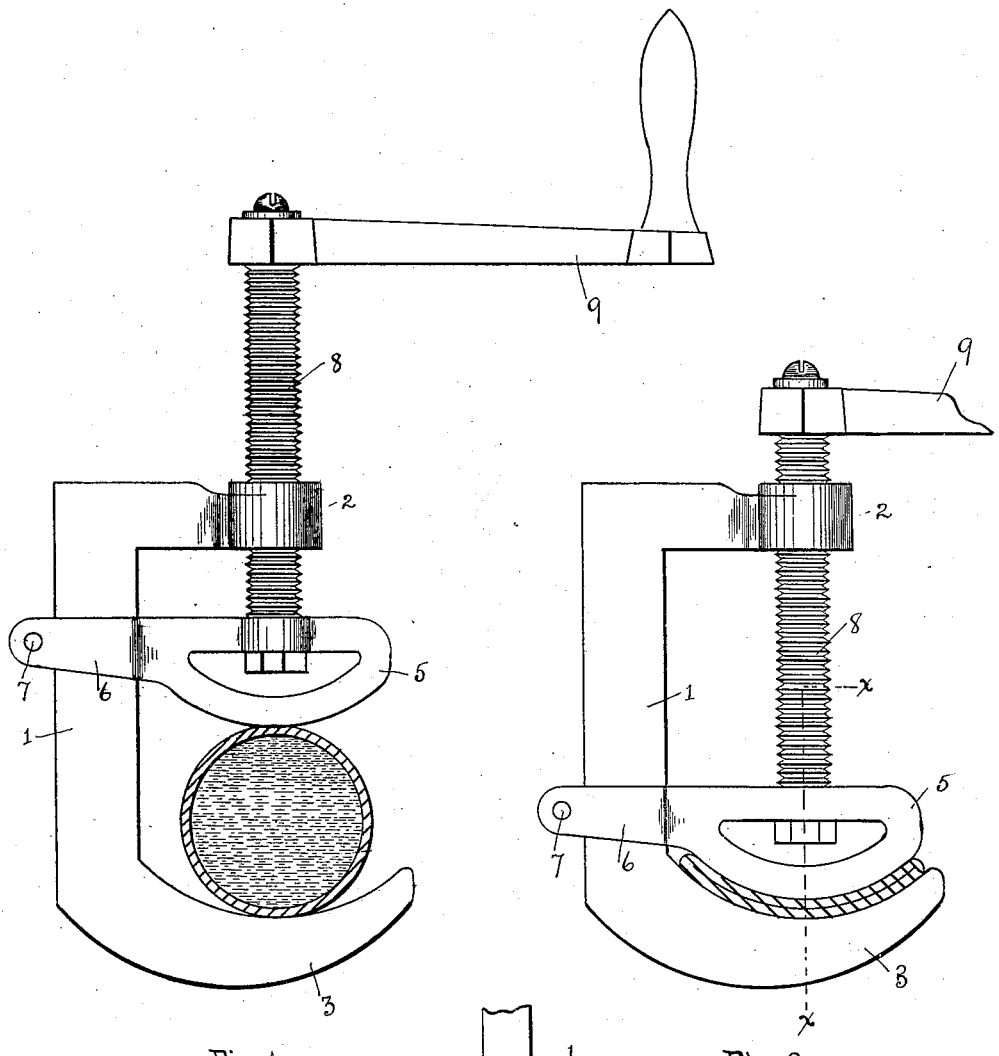
Fig. 1.   Fig. 2.
Fig. 3.
Attest:
B. Joms
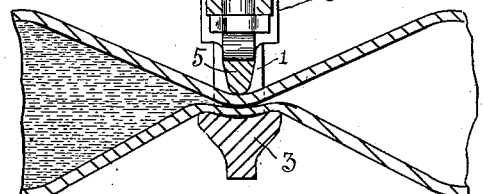
Inventor:
Joseph J. Forcier
By Jas. & Geo. P. Thomas
His Attys.

UNITED STATES PATENT OFFICE.

JOSEPH J. FORCIER, OF BAY CITY, MICHIGAN.

SHUT-OFF FOR HOSE.

SPECIFICATION forming part of Letters Patent No. 636,971, dated November 14, 1899.

Application filed November 9, 1898. Serial No. 695,940. (No model.)

*To all whom it may concern:*

Be it known that I, JOSEPH J. FORCIER, a citizen of the United States, residing at Bay City, in the county of Bay and State of Michigan, have invented certain new and useful Improvements in Shut-Offs for Hose, of which the following is a specification, reference being had therein to the accompanying drawings, forming a part thereof.

This invention relates to improvements in a clamp for shutting off the pressure on a hose, and is intended especially for use under high pressure where it is desirable to use an independent shut-off.

The invention consists in the combination, arrangement, and operation of the various parts and elements contained therein, as will be hereinafter more fully explained in detail, and which will be specifically pointed out in the claim of this specification.

It is often necessary at fires to temporarily shut off the supply of water on an individual hose in order that said hose may be moved to another location, and in order to do this where high pressure is carried it is customary to kink or bend the hose sufficiently to stop the flow of water. This operation is necessarily very unsatisfactory, as it usually requires the services of from four to six men who are compelled to hold the same while the hose is being moved or it is desired to keep the water shut off, and is further objectionable from the fact that it is usually impossible to shut the supply entirely off in this manner where a high pressure is carried, as is usually the case in fire-departments.

It is the object and intention of this invention to obviate these difficulties by providing a clamp that may be quickly and easily attached to a hose under high pressure at any desired point of the hose and by means of which the supply of water may be quickly and effectively stopped at said point as long as desired without detaining the operator from other duties during said period.

Another object of the invention is to provide a clamp for shutting off the supply of a hose which will be cheaply and durably constructed, and which will be simple and effective in its operation, and which will also operate to close upon and indent one side only of the hose and impinge upon a limited surface of the hose at the beginning of the compression, whereby the action of the compress upon the hose is rendered easy and effective and the liability of "cracking" or damaging the hose is reduced or avoided.

I attain these objects by means of the devices illustrated in the accompanying drawings, in which the same figures of reference will be found indicating the same parts or elements throughout the several views, and in which—

Figure 1 is a side view of my improved clamp attached to a hose in position before the supply is shut off. Fig. 2 is the same with the supply shut off. Fig. 3 is a section of the same taken at $x\ x$.

1 represents the vertical side of the body portion of my improved clamp, and 2 is the top or head portion of the same, which extends horizontally at a right angle with the said side 1 and is provided with a threaded opening at its outer end.

3 is the bottom of the body portion which forms the stationary jaw, the upper or engaging surface of which is concaved, describing the arc of a circle of a greater dimension than the periphery of the hose.

5 is the movable jaw, which is provided on one end with a yoke portion 6, passed over the side portion 1 and carrying a roller 7 for engaging with the outer side of the side 1, while the bottom or engaging surface of this jaw 5 is convex to coincide with the stationary jaw 3.

8 is a threaded rod passed through the threaded opening in the top 2, and extending downwardly is pivotally connected to the upper portion of the movable jaw 5, and is provided on its upper or outer end with a crank 9, by means of which the movable jaw may be actuated upwardly or downwardly.

The hose 10 is placed between the stationary jaw 3 and the movable jaw 5, after which the crank 9 is rotated, screwing the movable jaw downwardly till the opposite sides of the hose are clamped firmly together, thereby effectively shutting off the supply of water as long as the parts are left in this position, while to release the flow of water the movable jaw is raised upwardly, opening the clamp, and the device may then be removed from the hose. It will be readily seen that in this manner a cheap and effective clamp is provided which may be quickly and easily clamped on a hose at any desired point, and which when in operation will completely shut off the supply of water as long as desired without the necessity of the services of an operator to attend to the same during this period, and which when in position may be transported with the hose to any desired locality without liability of becoming detached. It will also be noticed that by means of my device the supply may be easily stopped by one operator, as the threaded rod 8, operated by the crank 9, affords an easy means of forcing the jaws together, while the jaw 3, being concaved to conform to the contour of the hose when under pressure, prevents the clamp from turning or becoming awry on the hose when turning the crank and brings the movable jaw in a position directly transverse with the hose, and the movable jaw, being made with a convex surface for contact with the convex surface of the hose, has the effect of forcing inwardly at the beginning only a limited portion of the hose and to cause the parts at the lateral sides of this compressed portion to move inwardly with a gradual or rolling bend until they are forced to a position with their inner surfaces against the inner surface of the opposite side of the hose, which avoids a liability of breaking or cracking the hose, which is a common effect or occurrence when the opposite parts of the hose are forced directly against each other between two flat or parallel surfaces.

Having described my invention, what I claim as new, and desire to secure by Letters Patent, is—

In a clamp for shutting off pressure in a hose, the combination of a body portion comprising a vertical side portion having a laterally-extending head portion provided with a vertical opening having a screw-thread and provided on its lower portion with a laterally-extending stationary jaw having on its upper side a concave surface for contact with and for clasping the hose, a movable jaw for opposing said stationary jaw and provided with a convex surface for contact with the hose and having a laterally-extending yoke portion passing on each side of said vertical side portion and carrying a friction-roller for contact with the outer side of said vertical portion, and a threaded rod passed through said vertical opening in the head, and with its lower end attached to the movable jaw, and provided on its upper end with a handle for turning the rod, substantially as set forth.

In testimony whereof I hereunto affix my signature in the presence of two witnesses.

JOSEPH J. FORCIER.

Witnesses:
  ANNA THOMAS,
  GEO. P. THOMAS.